(12) United States Patent
Cho et al.

(10) Patent No.: US 12,174,866 B2
(45) Date of Patent: Dec. 24, 2024

(54) METHOD AND APPARATUS FOR SEARCHING CONTENTS

(71) Applicant: SAMSUNG SDS CO., LTD., Seoul (KR)

(72) Inventors: Sung Won Cho, Seoul (KR); Seung Hyun Yoon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 18/202,638

(22) Filed: May 26, 2023

(65) Prior Publication Data

US 2023/0385314 A1    Nov. 30, 2023

(30) Foreign Application Priority Data

May 31, 2022   (KR) ........................ 10-2022-0066537

(51) Int. Cl.
*G06F 16/33* (2019.01)
*G06F 3/04883* (2022.01)
*G06F 16/338* (2019.01)

(52) U.S. Cl.
CPC ...... *G06F 16/3334* (2019.01); *G06F 3/04883* (2013.01); *G06F 16/338* (2019.01)

(58) Field of Classification Search
CPC . G06F 16/3334; G06F 16/338; G06F 3/04883
See application file for complete search history.

(56) References Cited

U.S. PATENT DOCUMENTS

| | | | |
|---|---|---|---|
| 8,489,602 B2 | 7/2013 | Nakayama et al. | |
| 8,838,562 B1 * | 9/2014 | Boyen | G06F 16/904 707/706 |
| 2012/0005583 A1 * | 1/2012 | Wong | G06F 16/958 715/738 |
| 2013/0226935 A1 * | 8/2013 | Bai | G06N 20/00 707/E17.014 |
| 2014/0143224 A1 * | 5/2014 | Allawi | G06F 16/3334 707/706 |
| 2015/0149429 A1 * | 5/2015 | Chilakamarri | G06F 16/9532 707/706 |
| 2019/0155949 A1 * | 5/2019 | Castaneda | G06F 16/9038 |
| 2020/0401645 A1 * | 12/2020 | Brown | H04W 4/14 |

FOREIGN PATENT DOCUMENTS

| | | |
|---|---|---|
| KR | 10-2003-0033497 A | 5/2003 |
| KR | 10-1054830 B1 | 8/2011 |
| KR | 10-2011-0129696 A | 12/2011 |
| KR | 10-1624420 B1 | 5/2016 |
| KR | 10-2036639 B1 | 10/2019 |
| KR | 10-2021-0097360 A | 8/2021 |

* cited by examiner

Primary Examiner — Dangelino N Gortayo
(74) Attorney, Agent, or Firm — Sughrue Mion, PLLC

(57) ABSTRACT

A method for searching a content includes receiving a predefined user input with respect to a text region; extracting, in response to the predefined user input, at least one word from the text region; creating a search condition based on the extracted at least one word; and displaying a list of contents searched based on the created search condition.

18 Claims, 18 Drawing Sheets

METHOD AND APPARATUS FOR SEARCHING CONTENTS

CROSS-REFERENCE TO RELATED APPLICATION

This application claims the benefit of Korean Patent Application No. 10-2022-0066537, filed on May 31, 2022, in the Korean Intellectual Property Office, the entire contests of which are incorporated herein by reference.

BACKGROUND

1. Technical Field

The present disclosure relates to a method and apparatus for searching contents. More specifically, it relates to a method and apparatus for searching contents without an input through a keypad.

2. Description of the Related Art

A method and apparatus capable of searching for contents related to a specific content through minimal user interaction without a separate keypad touch are provided.

In general, applications that provide a video content on terminals such as smartphones provide the content search result to the user when the user enters specific text through the touch of one or two fingers in the keypad at the bottom that appears by clicking the separate search button located on the interface of the application, and touches the OK button to search related videos for a specific video.

However, searching for a specific content by typing text one by one in a UI environment of a smart phone may hinder user convenience. For example, for users with relatively large fingers, it may be difficult to accurately touch each alphabet, number, and Korean consonant on the keypad, and if text is input by converting Korean and English characters several times, inconvenience may be caused to the user.

In addition, in the conventional content search method, it is moved to the search screen by clicking the search button, and the search result is identified by entering text in the search bar, and then moving to the result page again. According to this method, it is not easy for users to predict the search result according to the text input.

Accordingly, there is a need for a technology that allows a user to receive search results of desired content with minimal physical movement without touching a keypad in a terminal such as a smartphone.

SUMMARY

A technical problem to be solved by the present disclosure is to provide a method and apparatus capable of searching for contents without a separate keypad touch input by a user.

Another technical problem to be solved by the present disclosure is to provide a method and apparatus capable of conveniently searching for a desired content with minimal user interaction and physical movement.

Another technical problem to be solved by the present disclosure is to provide a method and apparatus capable of accurately searching for a desired content by creating various detailed search conditions using only one finger without text typing through a keypad.

Another technical problem to be solved by the present disclosure is to provide a content search method and apparatus having high search efficiency by allowing a user to create a search condition while checking search results in real time.

The technical problems of the present disclosure are not limited to the above-mentioned technical problems, and other technical problems not mentioned will be clearly understood by those skilled in the art from the description below.

According to an aspect of an example embodiment of the present disclosure, provided is a method performed by at least one processor for searching a content, the method including: receiving a predefined user input with respect to a text region; extracting, in response to the predefined user input, at least one word from the text region; creating a search condition based on the extracted at least one word; and displaying a list of contents searched based on the created search condition.

The extracted at least one word may include a plurality of words, and the creating the search condition may include: displaying at least one word to be used in creating the search condition in a first region; and displaying at least one word not to be used in creating the search condition in a second region.

The displaying the at least one word to be used in creating the search condition may include displaying at least one word whose number of searches is equal to or greater than a reference value in the first region.

The displaying the at least one word not to be used in creating the search condition may include: displaying, in response to a predefined user input with respect to a first word located in the second region, a plurality of button user interfaces (UIs) in a region adjacent to the first word, and the creating the search condition may include: creating the search condition in response to a user input with respect to at least one of the plurality of button UIs.

The plurality of button UIs may include a first button UI corresponding to an option for determining whether the first word is to be included in the search condition and a second button UI corresponding to an option for extracting a word related to the first word.

The creating the search condition in response to a user input with respect to at least one of the plurality of button UIs may include: displaying a plurality of words related to the first word in a region adjacent to the first word in response to a user input to the second button UI; and displaying any one word selected from among the displayed plurality of words in the second region.

The displaying the at least one word to be used in creating the search condition may include: displaying an indicator indicating whether a first word is included in the search condition in a region adjacent to the first word.

The displaying the at least one word to be used in creating the search condition may include: based on a user input to move a first word located in the second region to the first region, displaying the first word in the first region.

The displaying the at least one word not to be used in creating the search condition may include: based on a user input to move a first word located in the first region to the second region, displaying the first word in the second region.

The displaying the at least one word not to be used in creating the search condition may include: displaying a first word corresponding to information on a content publisher together with an indicator indicating that the first word is information on the content publisher in a region adjacent to the first word in the second region.

The displaying the at least one word not to be used in creating the search condition may include: based on a user input to move a first word located in the second region to a region adjacent to a second word in the second region, displaying a third word, in which the first word and the second word are combined, in the second region.

The displaying the third word in the second region may include: displaying, in response to a predefined user input with respect to the third word, a plurality of button UIs in a region adjacent to the third word, and the creating the search condition may include: creating the search condition in response to a user input with respect to the plurality of button UIs.

The plurality of button UIs may include a button UI corresponding to an option for restoring the third word to the first word and the second word.

A first word, included in the at least one word to be used in creating the search condition and displayed in the first region, may be also displayed in the second region, and the method may further include: adjusting a weight based on a user input with respect to the first word located in the second region while in a long-pressed state; and automatically displaying a search result, to which the adjusted weight is reflected.

The automatically providing the list of contents may include: expanding a third region based on a user input to swipe the third region upward; and displaying a UI corresponding to a sorting option in the expanded third region.

According to an aspect of an example embodiment of the present disclosure, provided is an apparatus for searching a content, the apparatus including: at least one processor; and at least one memory configured to store computer program executable by the at least one processor, wherein the computer program, when executed by the at least one processor, causes the at least one processor to perform: receiving a predefined user input with respect to a text region; extracting, in response to the predefined user input, at least one word from the text region; creating a search condition based on the extracted at least one word; and displaying a list of contents searched for based on the created search condition.

The creating the search condition may include: displaying at least one word to be used in creating the search condition in a first region; and displaying at least one word not to be used in creating the search condition in a second region.

The displaying the at least one word to be used in creating the search condition may include: based on a user input to move a first word located in the second region to move to the first region, displaying the first word in the first region.

The displaying the at least one word not to be used in creating the search condition may include: based on a user input to move a first word located in the first region to the second region, displaying the first word in the second region.

A first word, included in the at least one word to be used in creating the search condition and displayed in the first region, may be also displayed in the second region, and the computer program may further cause the at least one processor to perform: adjusting a weight based on a user input with respect to the first word located in the second region while in a long-pressed state; and automatically displaying a search result, to which the adjusted weight is reflected.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In describing the present disclosure, when it is determined that the detailed description of the related well-known configuration or function may obscure the gist of the present disclosure, the detailed description thereof will be omitted.

Hereinafter, embodiments of the present disclosure are described with reference to the accompanying drawings.

Figure 1:
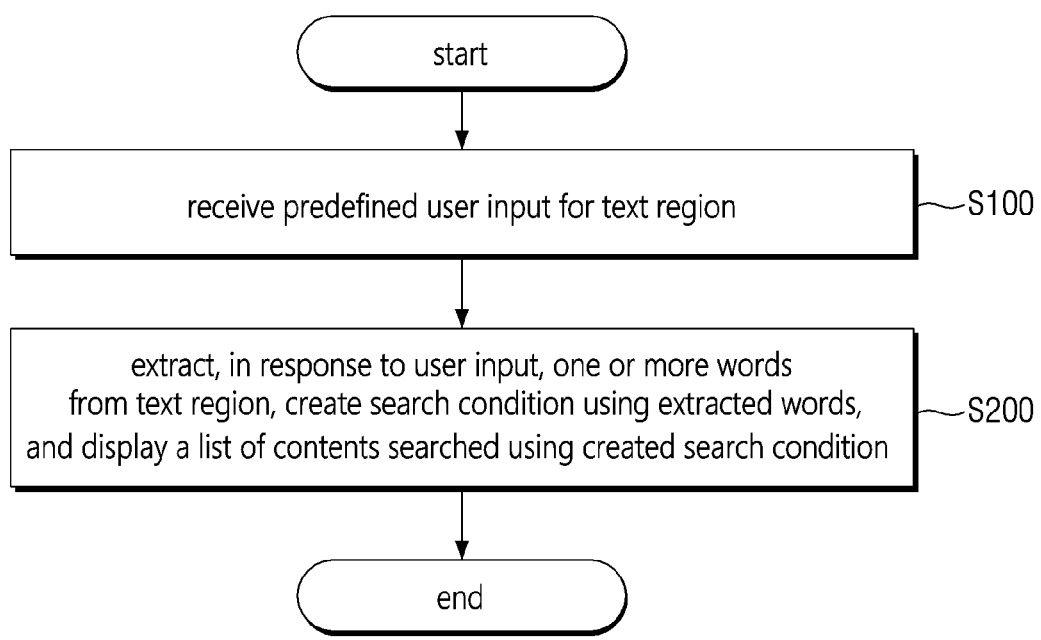
FIG. 1 is a flowchart illustrating a content search method according to an embodiment of the present disclosure.

FIG. 1 is a flowchart illustrating a content search method according to an embodiment of the present disclosure. However, this is only an example embodiment of the present disclosure, and some steps may be added or deleted as needed.

As shown in FIG. 1, the content search method starts at step S100 of receiving a predefined user input for a text region. In this case, the predefined user input may include various types of input methods, such as an input of touching a text region for a period of time equal to or greater than a reference value, and an input of continuously touching a text region a number of times equal to or greater than a reference value.

However, in the present specification, for convenience of description, the predefined input is described as a long-press, in which a text region is touched for a period of time equal to or greater than a reference value.

In addition, in the content search method according to the present disclosure, the content may include various types of content such as video, image, and music, but in this specification, it is assumed that the content is a video content.

In step S200, one or more words may be extracted from the text region in response to the user input, a search condition may be created using the extracted words, and a list of contents searched using the created search condition may be displayed.

Figure 2:
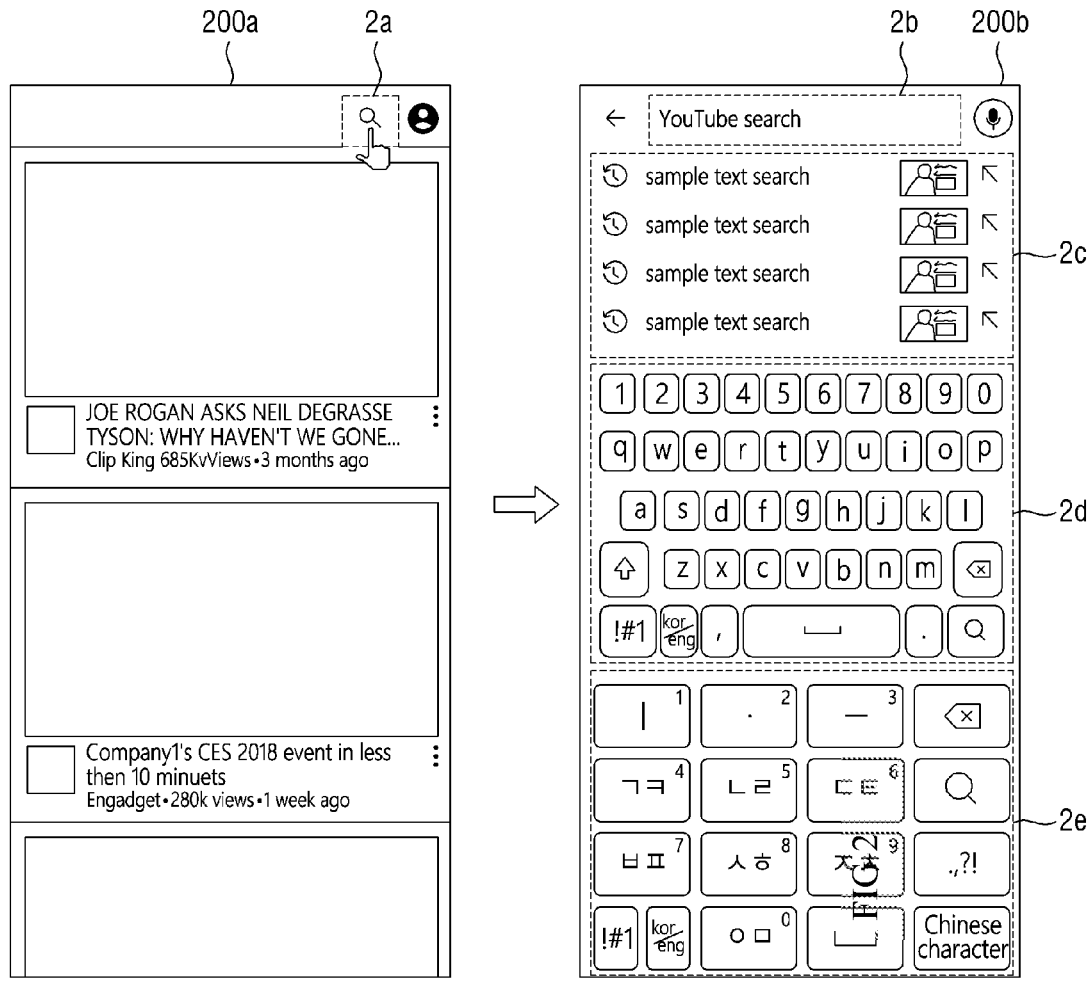
FIG. 2 is an exemplary view of a display screen for a conventional content search method using a user's keypad input.

FIG. 2 is an exemplary view of a display screen for a conventional content search method using a user's keypad input.

As shown on the left side of FIG. 2, as a result of execution of an application providing video contents, a list including a plurality of video contents may be provided on the screen 200a of the user terminal. The user may search for a content related to a specific video content belonging to the list including the plurality of video contents by touching the auxiliary UI 2a located at the top of the screen 200a of the user terminal.

On the right side of FIG. 2, a screen 200b of the user terminal provided in response to a user's touch on the auxiliary UI 2a located at the top of the screen 200a of the user terminal is shown. More specifically, a text input portion 2b, a past search history display portion 2c, an English keypad portion 2d, and a Korean keypad portion 2e may be displayed on the screen 200b of the user terminal.

The user may input text to be searched for using the keypad portions 2c and 2d at the bottom of the screen 200b of the user terminal and touch an OK button to receive a content search result.

However, in the case of a user with relatively large fingers, it may be difficult to accurately touch the keypad to input specific text because the sizes of each alphabet, number, and Korean consonant region of the keypad portions 2c and 2d are small. In addition, if a process of converting and inputting Korean and English characters several times is required, inconvenience may be caused to the user. In addition, the user cannot predict the result of text input until he or she touches the OK button after completing text input, and cannot set detailed search conditions other than text input in content search. Accordingly, there is a need for a method capable of searching for desired content with minimal physical movement without a keypad touch input by a user.

Figure 3:
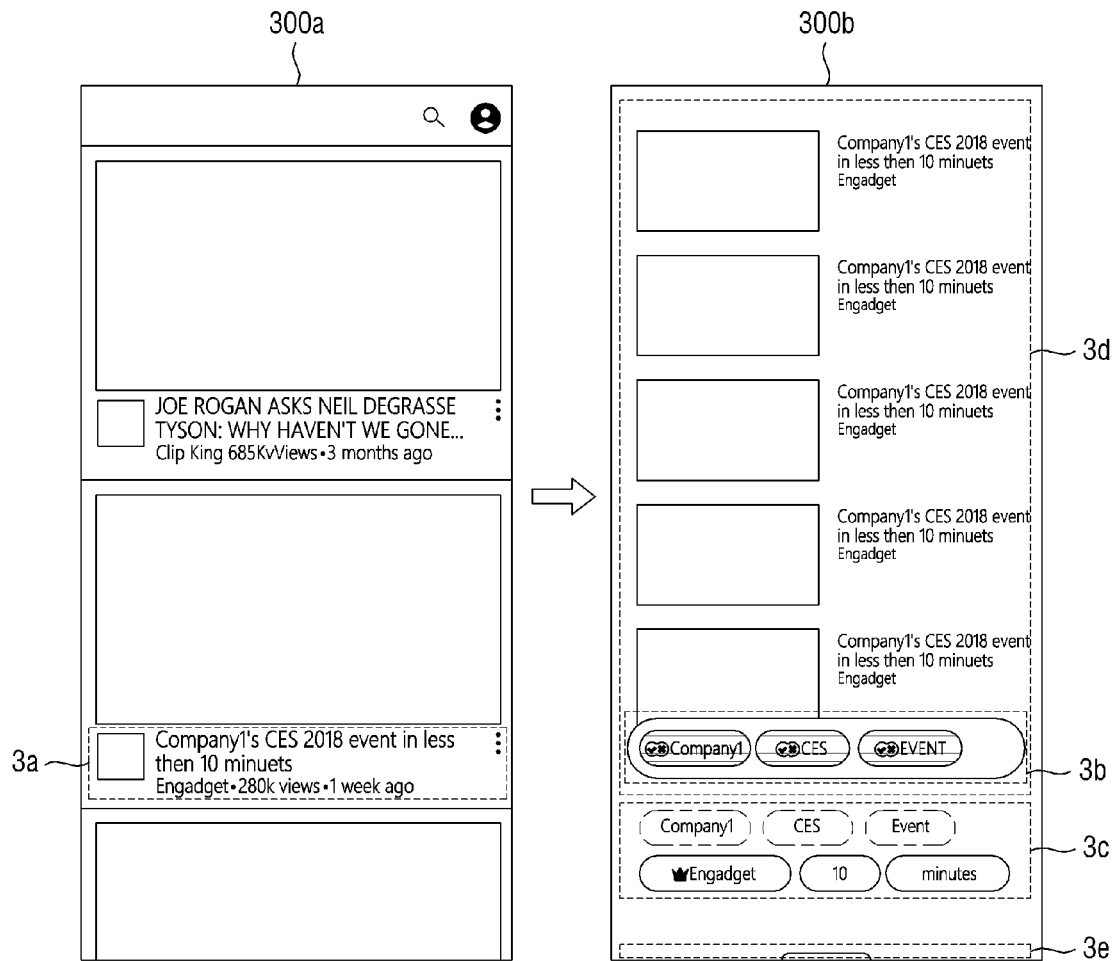
FIG. 3 is an exemplary view of a display screen for a content search method not relying on a user's keypad input according to an embodiment of the present disclosure.

FIG. 3 is an exemplary view of a display screen for a content search method not relying on a user's keypad input according to an embodiment of the present disclosure.

As shown on the left side of FIG. 3, as a result of execution of an application providing video contents, a list including a plurality of video contents may be provided on the screen 300a of the user terminal. The user may search for a content related to the specific video content through a predefined user input to the text region 3a of any one specific video content included in the list.

At this time, the text region 3a of the specific video content is a region containing basic information of individual content, and the basic information may include information such as title of the content, channel name, number of executions, and upload date.

Also, the predefined user input may be a long-press, which is an input of touching a text region for a period of time equal to or greater than a reference value. The screen shown on the right side of FIG. 3 may be displayed on the user terminal 300b through the user's long-press input.

In the content search method according to some embodiments of the present disclosure, the screen 300b of the user terminal is an exemplary view of a search mode screen capable of setting search conditions in detail through various user interactions.

As shown on the right side of FIG. 3, the screen 300b of the user terminal may include a search condition setting result display region 3b, a search condition setting region 3c, a search result content list display region 3d, and a sorting option selection region 3e.

More specifically, the search mode screen may be displayed by a user long-pressing the text region 3a of the screen 300a of the user terminal, and at this time, the server may extract one or more words using a plurality of texts included in the text region 3a. The words extracted by the server may be used to create search conditions, and the user may create search conditions through various interactions in the search condition setting region 3c of the user terminal screen 300b using the extracted words. In addition, the words set as the search condition may be displayed in the search condition setting result display region 3b, and a plurality of related contents reflecting the search condition setting result may be automatically displayed in the search result content list display region 3d.

Hereinafter, with reference to FIGS. 4 to 17, various interactions of users capable of setting search conditions in detail will be described in detail.

Figure 4:
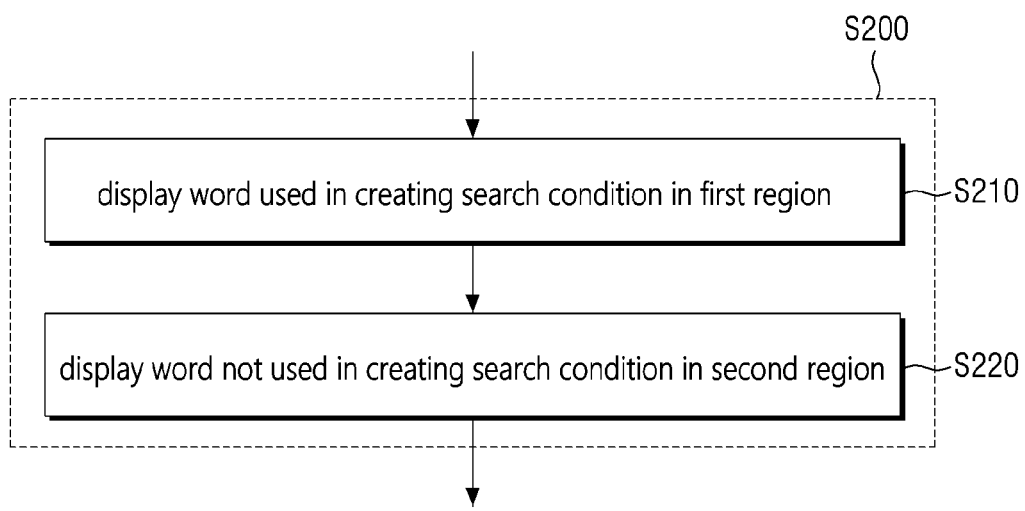
FIG. 4 is an exemplary view for describing detailed processes of some operations shown in FIG. 1.

FIG. 4 is an exemplary view for describing detailed processes of some operations shown in FIG. 1.

In step S210, the word used in creating the search condition for the content may be displayed on the search condition setting result display region 3b in the screen 300b of the user terminal of FIG. 3. In addition, in step S220, words not used in creating the search condition for the content may be displayed in the search condition setting region 3c in the screen 300b of the user terminal of FIG. 3. Hereinafter, it will be described in detail with reference to FIG. 5.

Figure 5:
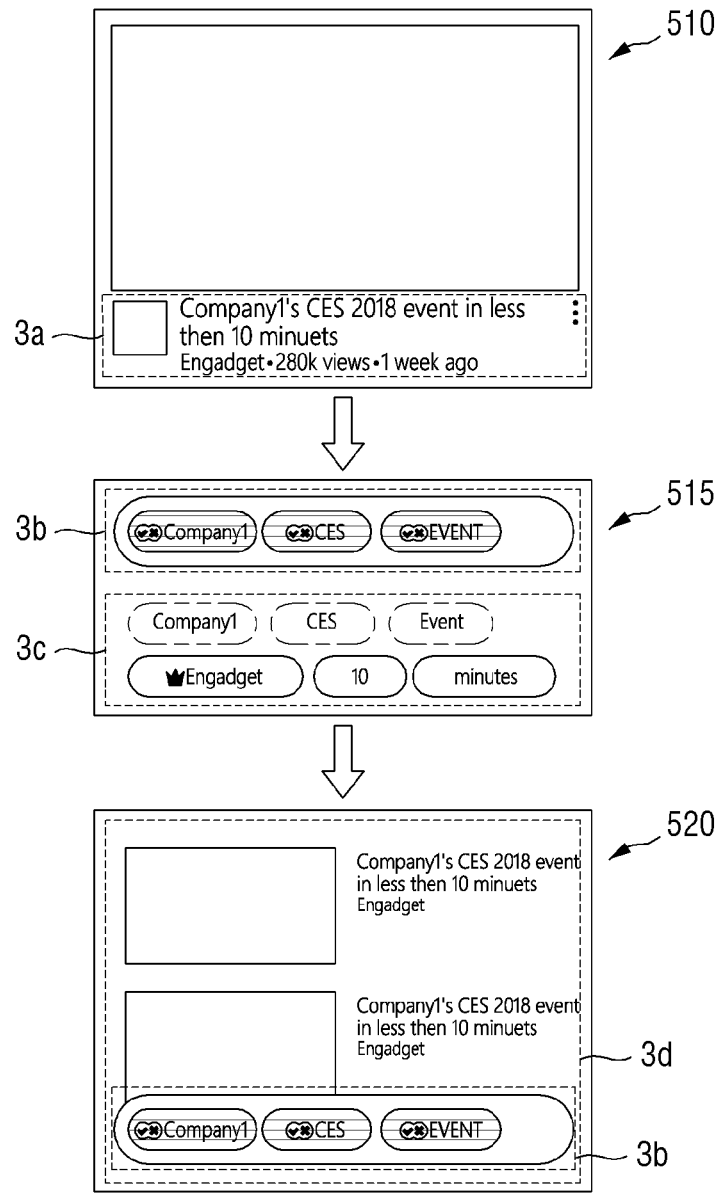
FIG. 5 is an exemplary view of an initial display screen when entering a search mode according to an embodiment of the present disclosure.

FIG. 5 is an exemplary view of an initial display screen when entering a search mode according to an embodiment of the present disclosure.

Referring to FIG. 5, a search mode screen may be displayed in response to a user's long-press input to the text region 3a of specific content. At this time, the server may analyze a plurality of texts included in the text region 3a and extract one or more words as a result of the analysis.

For example, the server may analyze the content title "COMPANY1's CES 2018 event in less than 10 minutes" and the channel name "Engadget" where the content is posted included in the text region 3a, and extract the words of "COMPANY1", "CES", "event", "Engadeget", "10", and "minutes".

At this time, the server may analyze the number of word searches on the content providing platform. Therefore, on the screen upon entering the initial search mode, a certain number of recommended words or more may be extracted in the order of the number of searches, and they may be automatically displayed on the search condition setting result display region 3b. In addition, words, for which the number of searches is equal to or greater than a reference value, may be extracted as recommended words and automatically displayed in the search condition setting result display region 3b.

On the other hand, when entering the initial search mode, as a criterion for automatically extracting the recommended word by the server, the user's past search history, the search history of other users having properties similar to the user, and the like may be used, rather than the number of searches. In addition, there may be no criterion for automatically extracting the recommended words by the server. In this case, all words extracted by the server may be displayed in the search condition setting region 3c.

Accordingly, the user's convenience may be improved by automatically searching for a content related to a specific content without a user's separate interaction and providing the user with a search result list of the related content.

Meanwhile, words not displayed in the search condition setting result display region 3b may be displayed in the search condition setting region 3c. In the case of a word displayed in the search condition setting result display region 3b, it may be displayed in a way that the word is distinguished from the word displayed in the search condition setting result display region 3b rather than the word is not displayed in the search condition setting region 3c.

At this time, the words displayed in the search condition setting result display region 3b and the words displayed in the search condition setting region 3c may be distinguished in various ways, such as the color, thickness, the font of the text and whether or not the adjacent outer region of the text is colored, color, and the shape of the region boundary line.

For example, the words "COMPANY1", "CES", and "Event" displayed in the search condition setting result display region 3b may belong to the inside of a colored figure. On the other hand, the words "COMPANY1", "CES", and "Event" displayed in the search condition setting region 3c may be located inside a figure that is not filled with color, and the outline of the figure may be indicated by a dotted line.

The user may set search conditions in detail through various interactions using words displayed in the search condition setting result display region 3b and the search condition setting region 3c. A search result, in which a search condition set by the user is reflected in real time, may be displayed in the search result content list region 3d.

Figure 6:
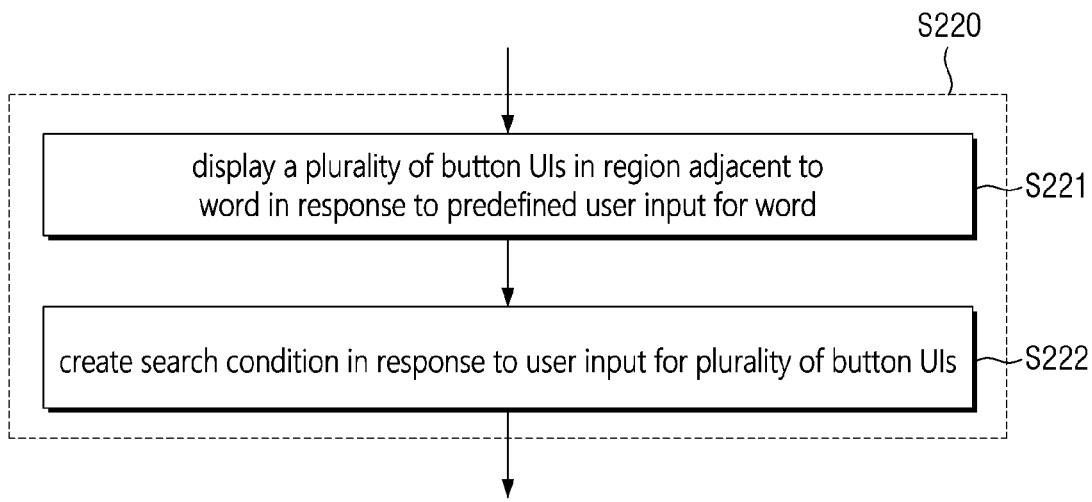
FIG. 6 is an exemplary view for describing detailed processes of some operations shown in FIG. 4.

FIG. 6 is an exemplary view for describing detailed processes of some operations shown in FIG. 4.

In step S221, a plurality of button UIs may be displayed in a region adjacent to a word in response to a predefined user input for the word located in the search condition setting result display region 3b. At this time, the predefined user's input may be a long-press, in which the user touches the text region for a period of time equal to or greater than a reference value, but is not limited thereto and may include various user inputs.

In step S222, a search condition may be created in response to a user's input to the plurality of button UIs. In this case, the user's input may be a touch input, but is not limited thereto and may include various types of user input.

Figure 7:
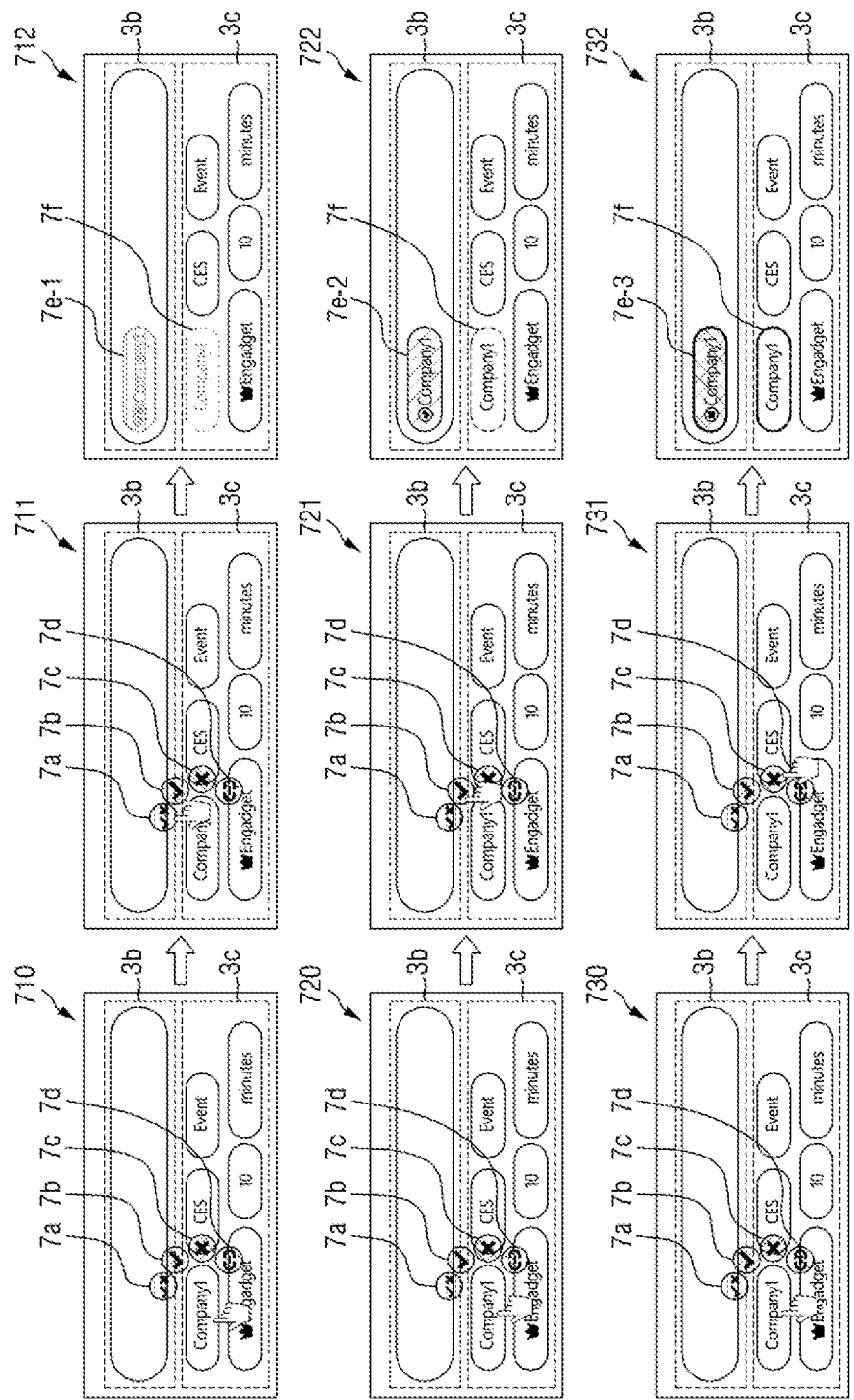
FIG. 7 is an exemplary diagram of an interaction for selecting whether a word is included in a search condition according to an embodiment of the present disclosure.

FIG. 7 is an exemplary diagram of an interaction for selecting whether a word is included in a search condition according to an embodiment of the present disclosure.

As shown in FIG. 7, in response to a user's long-press input on the word "COMPANY1" among words located in the search condition setting region 3c, a plurality of button UIs 7a, 7b, 7c, 7d may be displayed in a region adjacent to the word "COMPANY1".

At this time, the plurality of button UIs 7a, 7b, 7c, and 7d may include first button UIs 7a, 7b, and 7c corresponding to an option for determining whether the word "COMPANY1" is included in a search condition and a second button UI 7d corresponding to an option for extracting a word related to the word "COMPANY1".

More specifically, the first button UIs 7a, 7b, and 7c may include the UI 7a corresponding to a condition state, in which a specific word is included in the search condition one or more, the UI 7b corresponding to a condition state, in which the specific word is necessarily included in the search condition, and the UI 7c corresponding to a condition state, in which a specific word is not included in the search condition.

At this time, the first button UIs 7a, 7b, 7c and the second button UI 7d may be distinguished by color, hatching, outline shape, icon, and the like.

Next, the user may touch the first button UIs 7a, 7b, and 7c to determine a condition state, in which a specific word is included in a search condition. Accordingly, more detailed search conditions may be set according to the user's selection, and the user may accurately search for a desired content based on the set search conditions.

For example, the user may create a search condition, in which the word "COMPANY1" is included in the search condition one or more by touching the UI 7a corresponding to a condition state, in which a specific word is included in the search condition one or more. This means that the word "COMPANY1" is used in the content search, but does not necessarily have to be used.

Referring to the icon 7e-1 shown in the right box 712 of FIG. 7, when the word "COMPANY1" is set to be included in the search condition one or more, the word "COMPANY1" may be displayed in the search condition setting result display region 3b. At this time, in a region adjacent to the word "COMPANY1", an auxiliary UI similar to the UI 7a corresponding to a condition state, in which a specific word is included in the search condition one or more, may be displayed together with the word "COMPANY1".

For another example, the user may create a search condition, in which the word "COMPANY1" is necessarily included in the search condition by touching the UI 7b corresponding to a condition state, in which a specific word is necessarily included in the search condition. This means that the word "COMPANY1" should be used for content search.

Referring to the icon 7e-2 shown in the right box 722 of FIG. 7, when the word "COMPANY1" is set to be necessarily included in the search condition, the word "COMPANY1" may be displayed in the search condition setting result display region 3b. At this time, in a region adjacent to the word "COMPANY1", an auxiliary UI similar to the UI 7b corresponding to a condition state, in which a specific word is necessarily included in a search condition, may be displayed together with the word "COMPANY1".

For another example, the user may touch the UI 7c corresponding to a condition state, in which a specific word is not included in the search condition, to create a search condition, in which the word "COMPANY1" is not included in the search condition. This means that the word "COMPANY1" is excluded from content search.

Referring to the icon 7e-2 shown in the right box 722 of FIG. 7, even when the word "COMPANY1" is set to not be included in the search condition, the word "COMPANY1" may be displayed in the search condition setting result display region 3b. At this time, an auxiliary UI similar to the UI 7c corresponding to a condition state, in which a specific word is not included in the search condition, may be displayed in a region adjacent to the word "COMPANY1".

On the other hand, the icons 7e-1, 7e-2, 7e-3 located in the search condition setting result display region 3b and the word 7f displayed in the search condition setting region 3c may be distinguished in various ways, such as the color, thickness, font of the text, whether or not the adjacent outer region of the text is colored, the color, and the shape of a region boundary line.

Accordingly, a search condition is created by determining the extent to which a specific word is included in a search condition through a minimum user interaction, and a content search result reflecting the created search condition may be automatically provided to the user. That is, the user may more accurately and conveniently search for desired content.

Meanwhile, a detailed description of the user interaction related to the second button UI 7d will be described later with reference to FIG. 13.

Figure 8:
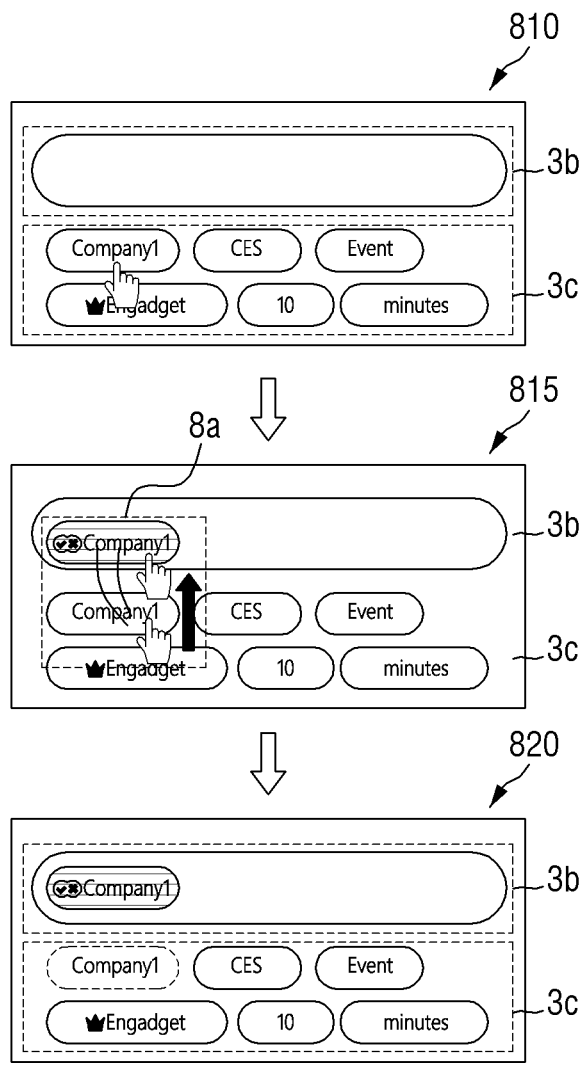
FIG. 8 is an exemplary view of an interaction for adding a word to be used in a search condition according to an embodiment of the present disclosure.

FIG. 8 is an exemplary view of an interaction for adding a word to be used in a search condition according to an embodiment of the present disclosure.

The user may create a new search condition by touching one of the words located in the search condition setting region 3c once or swiping it to the search condition setting result display region 3b. At this time, by default, a specific word may be set to be included in the search condition one or more.

For example, referring to the user interaction 8a shown in FIG. 8, when the user touches the word "COMPANY1" located in the search condition setting region 3c once or swipes it to the search condition setting result display region 3b, a new search condition may be created by displaying the word "COMPANY1" in the search condition setting result display region 3b. At this time, the word "COMPANY1" may be set to be included in the search condition one or more, and a UI 7b corresponding to a condition state, in which the word is included in the search condition one or more, may be displayed together in a region adjacent to the word "COMPANY1".

Figure 9:
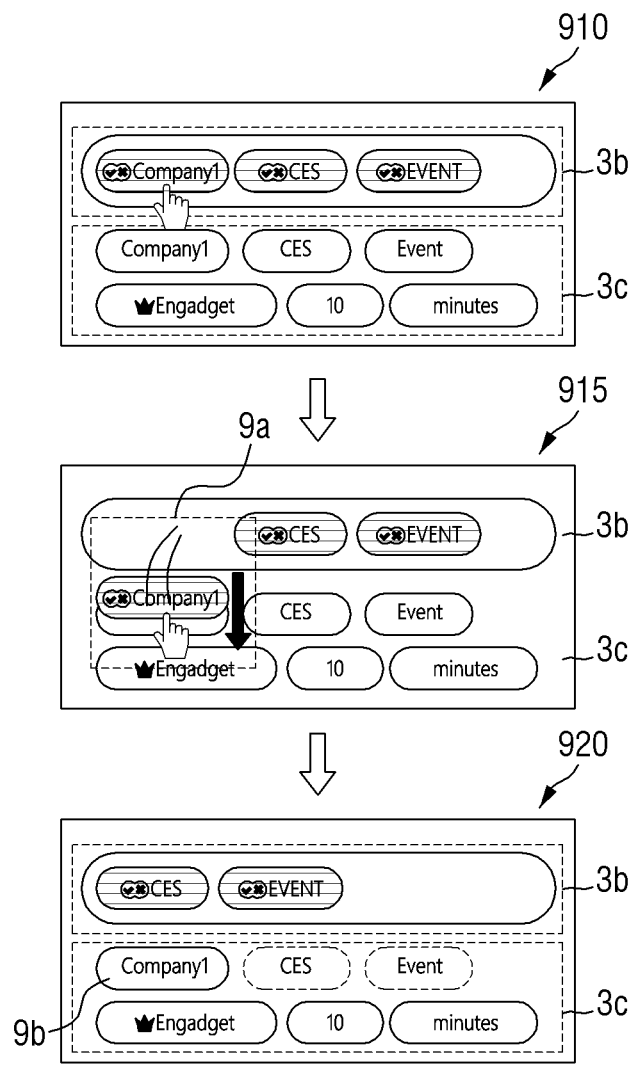
FIG. 9 is an exemplary view of an interaction of deselecting a word selected as a search condition according to an embodiment of the present disclosure.

FIG. 9 is an exemplary view of an interaction of deselecting a word selected as a search condition according to an embodiment of the present disclosure.

The user may swipe any one of the words located in the search condition setting result display region 3b to the search condition setting region 3c to deselect a specific word selected as a search condition.

For example, referring to the user interaction 9a shown in FIG. 9, when the user swipes the word "COMPANY1" located in the search condition setting result display region 3b to the search condition setting region 3c, the word "COMPANY1" may disappear from the search condition setting result display region 3b. That is, the word "COMPANY1" selected as a condition, in which it is included in the search condition one or more, may be deselected, and displayed in the search condition setting region 3c.

Accordingly, whether to use a specific word as a search condition is determined through minimal user interaction, and content search results reflecting the determination may be automatically provided to the user. That is, the user may more accurately and conveniently search for a desired content.

Figure 10:
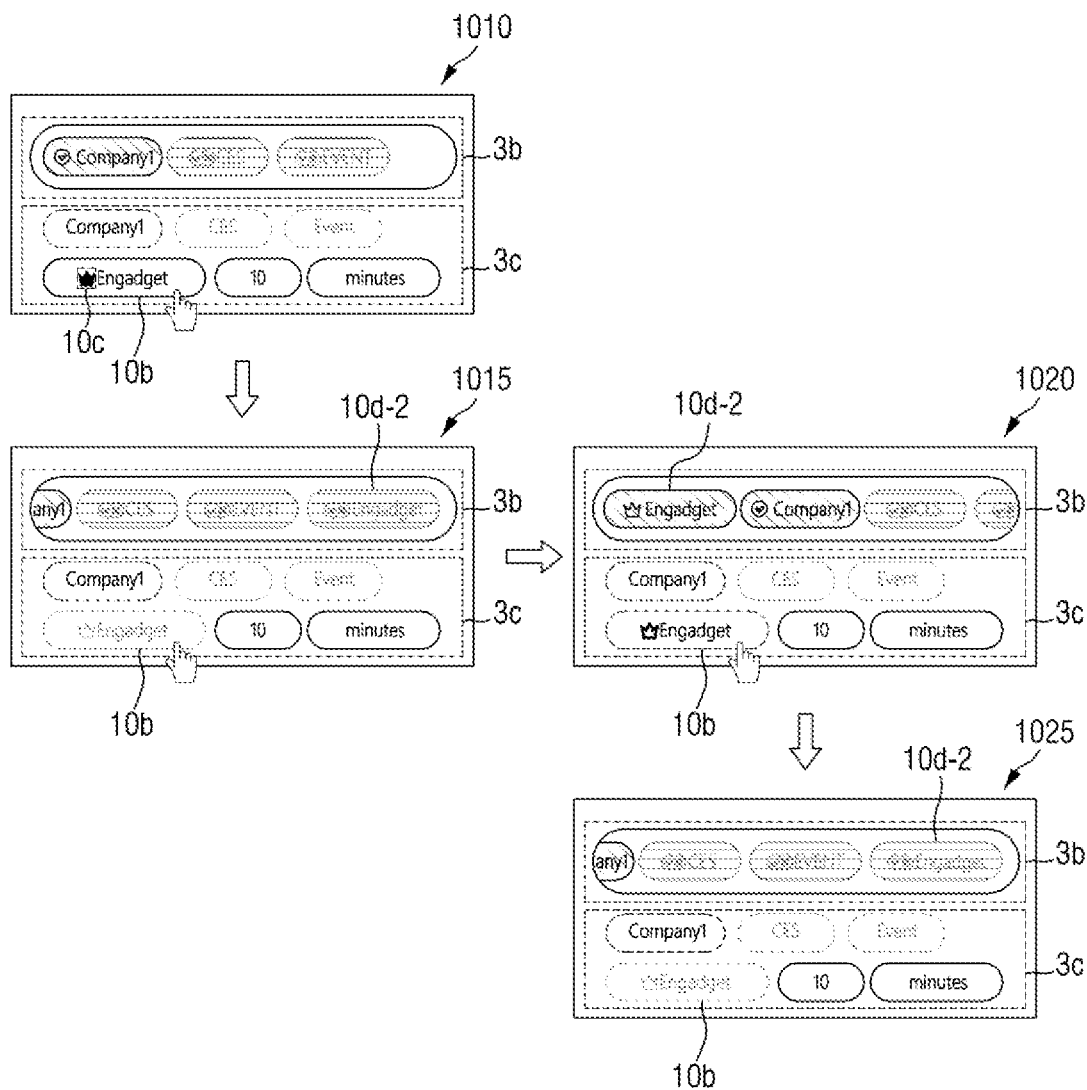
FIG. 10 is an exemplary view of an interaction related to a word corresponding to information of a content publisher according to an embodiment of the present disclosure.

FIG. 10 is an exemplary view of an interaction related to a word corresponding to information of a content publisher according to an embodiment of the present disclosure.

Among the words extracted from the text region 3a, words corresponding to information about a content publisher, such as the name of a channel, to which the content belongs, may be included. Therefore, the name of the channel is also one of words, and may be appropriately used in the process of setting search conditions through various user interactions as described above. Accordingly, a detailed description of how the channel name word is utilized in the search condition through the above-described user interaction will be omitted.

Hereinafter, a content search method capable of providing a search result within a specific channel using a name word of a channel according to an embodiment of the present disclosure will be described.

As shown in FIG. 10, an icon 10b including the name word of the channel "Engadget" may be displayed in the search condition setting region 3c. At this time, a separate auxiliary UI 10c indicating that it is the name word of the channel may be displayed together in a region adjacent to the name word "Engadget" of the channel.

The user may touch the name word "Engadget" of the channel or swipe it to the search condition setting result display region 3b. Accordingly, a new search condition may be created by displaying an icon 10d-1 including the word "Engadget" in the search condition setting result display region 3b.

Next, the user may be provided with a search result of content belonging to the channel "Engadget" through a predefined user input for the name word of the channel "Engadget" located in the search condition setting region 3c. At this time, since the word "Engadget" is used to search for content within the "Engadget" channel, the word "Engadget" may lose qualification as a search condition as a word used for a content search condition. In addition, the predefined user input may be an input of touching a specific region twice in succession, but may include other predefined user inputs in various ways.

When the word "Engadget" is used to search for content within a specific channel, an icon 10d-2 displayed together with a separate auxiliary UI 10c indicating that it is the name word of a channel may be displayed in a region adjacent to the word "Engadget".

On the other hand, if the user touches the search condition region 3c while content search within the channel "Engadget" is applied, the word "Engadget" is no longer used to search for content within the channel, but may be changed to a word used in the search condition setting of content.

Accordingly, the user may be automatically provided with content search results within a specific channel by using the name word of the channel as a search condition through minimal user interaction. That is, the user may more accurately and conveniently search for content included in the channel of interest.

Figure 11:
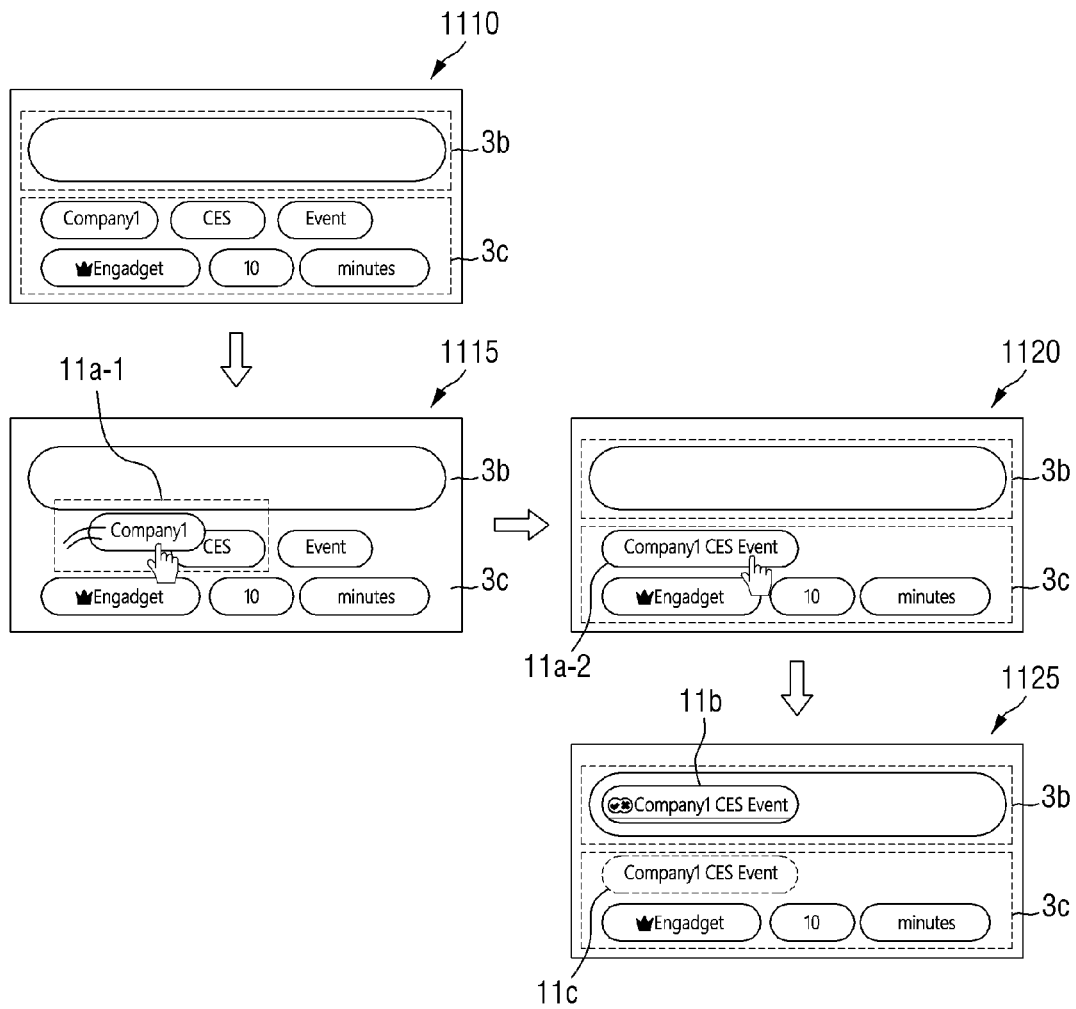
FIG. 11 is an exemplary view of an interaction creating a search condition by combining a plurality of words according to an embodiment of the present disclosure.

FIG. 11 is an exemplary view of an interaction creating a search condition by combining a plurality of words according to an embodiment of the present disclosure.

The user may swipe the first word to a region adjacent to the second word among the first word and the second word located in the search condition setting region 3c, thereby creating a third word, in which the first word and the second word are combined.

For example, as shown in FIG. 11, the user may create the word "COMPANY1 CES" through an interaction 11a-1 of swiping the word "COMPANY1" located in the search condition setting region 3c to a region adjacent to the word "CES" In addition, the word "COMPANY1 CES Event" may be created by swiping the created word "COMPANY1 CES" to a region adjacent to the word "Event".

Furthermore, the user may touch the created word "COMPANY1 CES Event" 11a-2 once or swipe it to the search condition setting result display region 3b. Accordingly, a new search condition may be created by displaying an icon 11b including the word "COMPANY1 CES Event" in the search condition setting result display region 3b.

Figure 12:
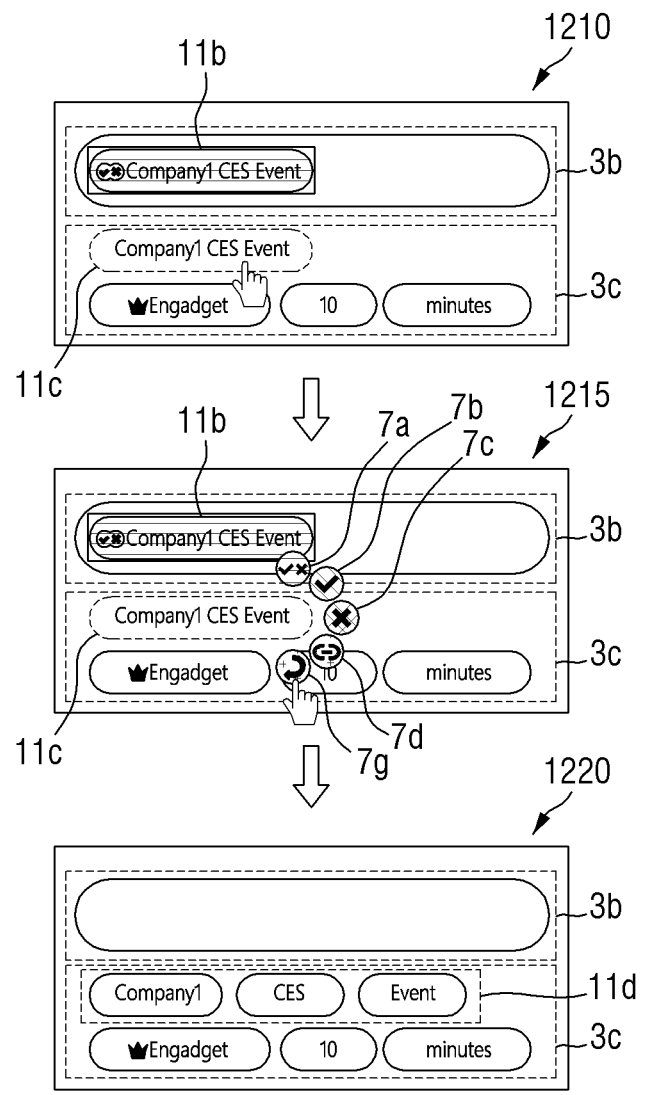
FIG. 12 is an exemplary view of an interaction of releasing a combination of a plurality of words combined in FIG. 11 according to an embodiment of the present disclosure.

FIG. 12 is an exemplary view of an interaction of releasing a combination of a plurality of words combined in FIG. 11 according to an embodiment of the present disclosure.

As described with reference to FIG. 11, a third word may be created by combining the first word and the second word. A plurality of button UIs may be displayed in a region adjacent to the third word in response to a predefined user input for the third word. At this time, the predefined user input may be a long-press, in which the user touches the text region for a period of time equal to or greater a reference value, but is not limited thereto and may include various user inputs.

In addition, a search condition may be created in response to a user input to the plurality of button UIs. In this case, the user input may be a touch input, but is not limited thereto and may include various types of user input.

Meanwhile, as shown in FIG. 12, in response to the user's long-press input on the word "COMPANY1 CES Event" 11c, a plurality of button UIs 7a, 7b, 7c, 7d, 7g may be displayed.

At this time, the contents related to the plurality of button UIs 7a, 7b, 7c, and 7d will be omitted since they have been described in detail with reference to FIG. 7 above. Hereinafter, the third button UI 7g corresponding to an option capable of releasing and restoring a combination of a plurality of words to each word will be described.

Referring back to FIG. 12, the combination of a plurality of word may be released in response to a user's touch input to the third button UI 7g displayed in a region adjacent to the word "COMPANY1 CES Event". That is, referring to the region 11d located inside the search condition setting region 3c shown on the bottom side of FIG. 12, the word "COMPANY1", the word "CES", and the word "Event" may be restored to their original form and displayed. Furthermore, the word "COMPANY1 CES Event" may disappear from the search condition setting result display region 3b.

Accordingly, a user may create various search conditions by combining or releasing a plurality of words through minimal user interaction, and content search results reflecting the created search conditions may be automatically provided to the user.

That is, the user may more accurately and conveniently search for a desired content.

Figure 13:
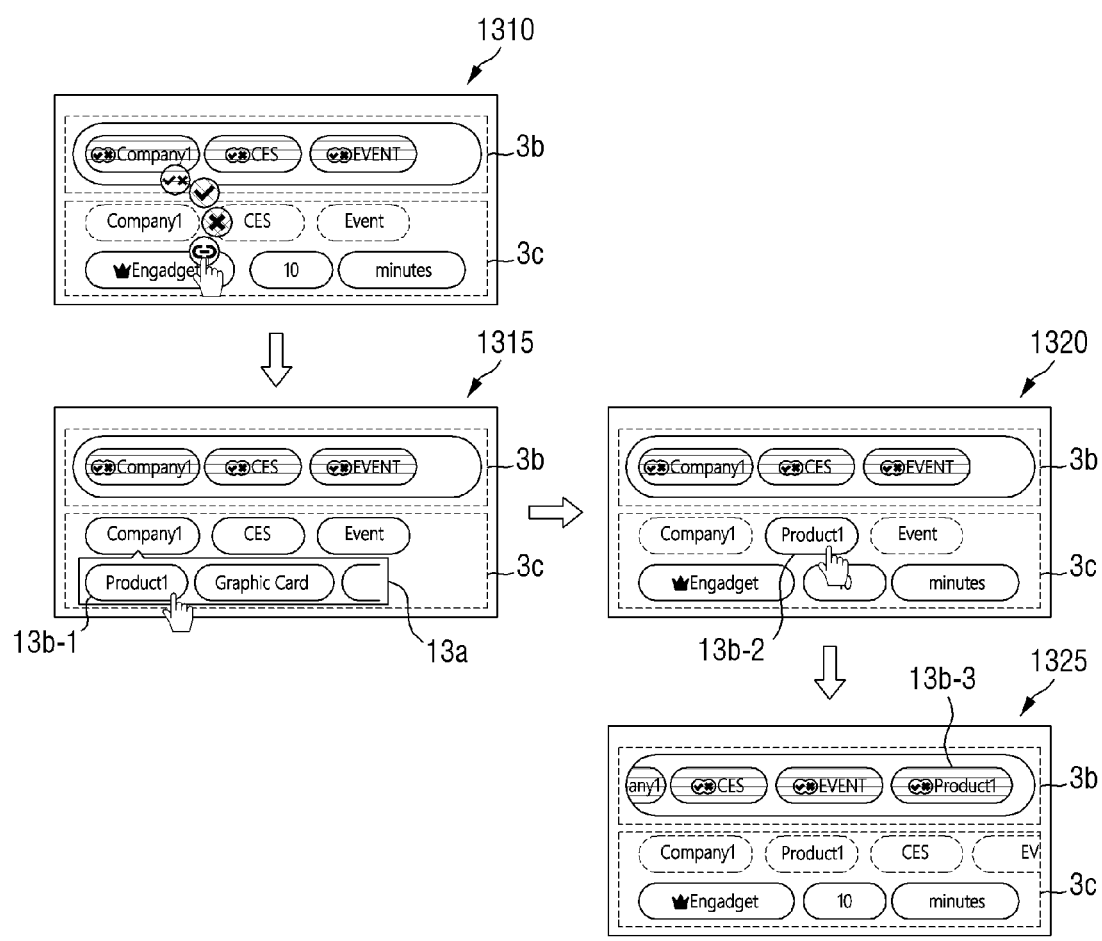
FIG. 13 is an exemplary view of an interaction of extracting one or more words related to a specific word and creating a search condition using the extracted words, according to an embodiment of the present disclosure.

FIG. 13 is an exemplary view of an interaction of extracting one or more words related to a specific word and creating a search condition using the extracted words, according to an embodiment of the present disclosure.

As described above with reference to FIG. 7, in response to the user's long-press input on the word "COMPANY1" among the words located in the search condition setting region 3c, a plurality of button UIs 7a, 7b, 7c, and 7d may be displayed in the region adjacent to the word "COMPANY1".

At this time, the plurality of button UIs 7a, 7b, 7c, and 7d may include first button UIs 7a, 7b, and 7c corresponding to an option for determining whether the word "COMPANY1" is included in a search condition and the second button UI 7d corresponding to an option for extracting a word related to the word "COMPANY1". Since the first button UIs 7a, 7b, and 7c have been described in detail in the description of FIG. 7, the second button UI 7d will be described in detail with reference to FIG. 13.

The user may touch the second button UI 7d to select an option to receive a word similar to or related to the word "COMPANY1" long-pressed by the user. In response to the user's touch input to the second button UI 7d, the server may extract a plurality of recommended words by analyzing similar or related words to the word "COMPANY1". Accordingly, a plurality of words related to the word "COMPANY1" may be displayed in a region adjacent to the word "COMPANY1".

For example, as shown in FIG. 13, words related to the word "COMPANY1" such as "Product1" and "Graphic Card" may be displayed in a region adjacent to the word "COMPANY1". Therefore, the user may add the word "Product1" to the search condition setting region 3c by touching the word "Product1" 13b-1 located in the display region 13a of related words, and when creating search conditions, appropriately utilize it.

Furthermore, the user may touch the word "Product1" 13b-2 located in the search condition setting region 3c or swipe it to the search condition setting result display region 3b. Accordingly, a new search condition may be created by displaying the word "Product1" 13b-3 in the search condition setting result display region 3b.

Accordingly, a user may create various search conditions by adding a word related to a specific word as a search condition through minimal user interaction, and content search results reflecting the created search condition may be automatically provided to the user. That is, the user may more accurately and conveniently search for a desired content.

Figure 14:
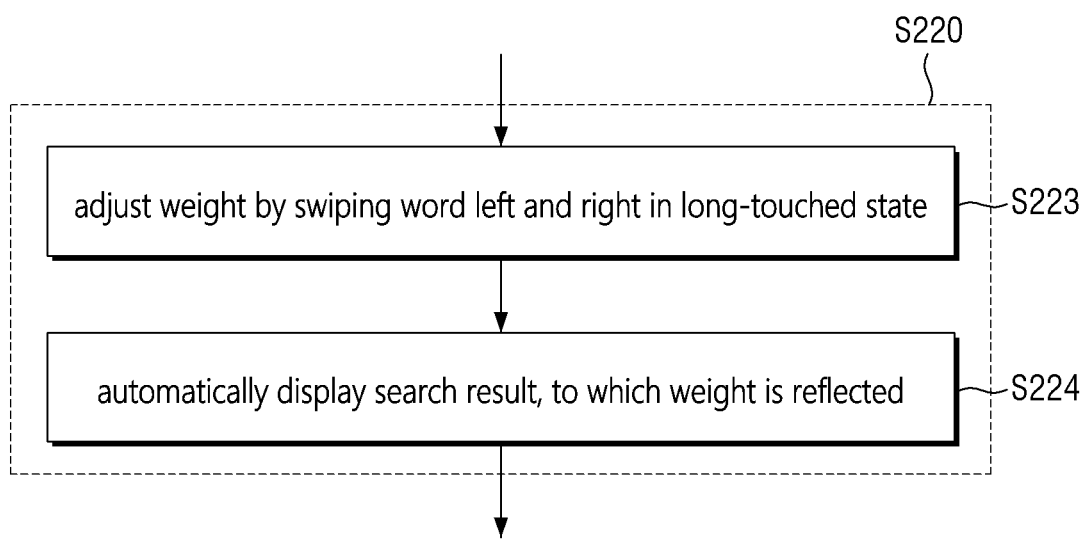
FIG. 14 is an exemplary diagram for describing detailed processes of some operations shown in FIG. 4.

FIG. 14 is an exemplary diagram for describing detailed processes of some operations shown in FIG. 4.

In step S223, the user may adjust a weight, in which the specific word is reflected in the search condition, by swiping left and right while long-pressing the word located in the search condition setting result display region 3b. At this time, the weight may be visually distinguished according to the ratio of the color of the inside of the icon including the specific word, but various other methods may be used, in which the user may visually identify the reflection ratio of the weight.

In step S224, the search result, to which the weight is reflected, may be automatically displayed on the screen of the user terminal. More specifically, a plurality of contents searched by reflecting the weight may be automatically displayed in the search result contents list region 3d in the user terminal screen.

Figure 15:
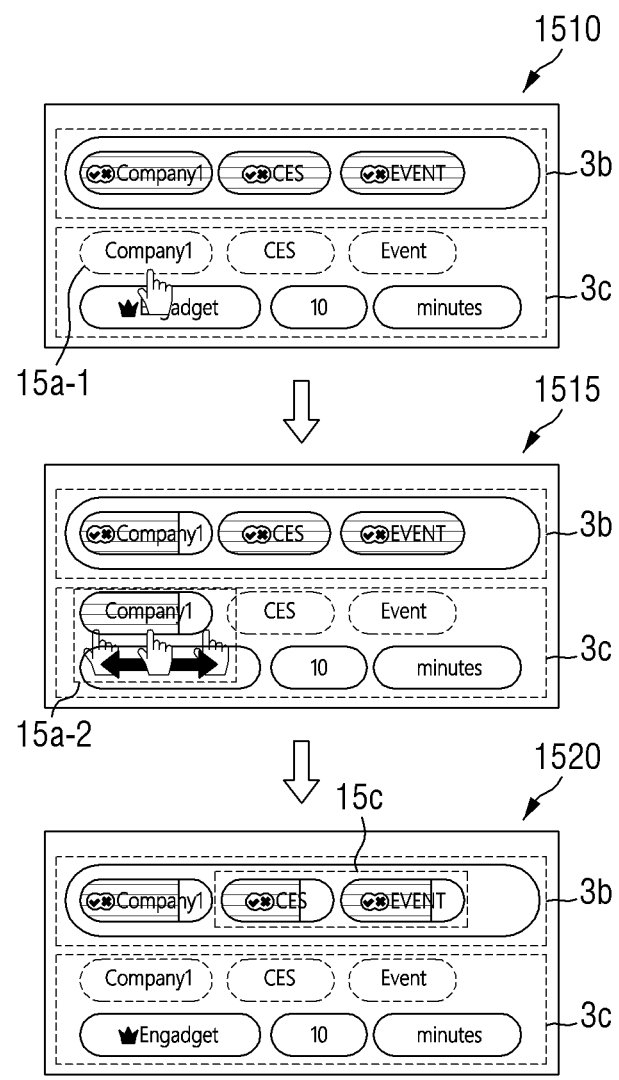
FIG. 15 is an exemplary view of an interaction of adjusting a search weight of a word and creating a search condition using the adjusted weight according to an embodiment of the present disclosure.

FIG. 15 is an exemplary view of an interaction of adjusting a search weight of a word and creating a search condition using the adjusted weight according to an embodiment of the present disclosure.

As shown in FIG. 15, the user may adjust the weight, in which the word "COMPANY1" is reflected in the search condition, by swiping left and right while long-pressing the word "COMPANY1" 15*a*-1 located in the search condition setting region 3*c*.

At this time, by the interaction 15*a*-2, in which the user long-presses the word "COMPANY1" located in the search condition setting region 3*c* and swipes left and right, the coloring ratio inside the icon 15*b* including the word "COMPANY1" may be changed. Specifically, when the user swipes right, the internal coloring ratio of the icon 15*b* including the word "COMPANY1" may increase, and when the user swipes left, the internal coloring ratio of the icon 15*b* including the word "COMPANY1" may decrease.

In addition, in response to the interaction, in which the user long-presses the word "COMPANY1" located in the search condition setting region 3*c* and swipes left and right, the internal coloring ratio of the icon including the word "COMPANY1" located in the search condition setting result display region 3*b* may also be changed.

Meanwhile, search weights of a plurality of words located in the search condition setting region 3*c* may also be adjusted by the user's long-press and left and right swipe interaction. Referring to the region 5*c* located inside the search condition setting result display region 3*b* shown on the bottom side of FIG. 15, the search weight for "COMPANY1", "CES" and "Event" may be adjusted, and the search condition, in which "Event", "COMPANY1", and "CES" are weighted in the order, may be newly created.

Finally, the plurality of contents searched using the search condition reflecting the search weight of each of the plurality of words adjusted by the user may be automatically displayed in the search result content list region 3*d*.

In summary, the user may adjust the search condition that may satisfy the user's needs by adjusting the weight of a plurality of words through minimal user interaction, and the content search result reflecting the adjusted search condition may be automatically provided to the user. That is, the user may more accurately and conveniently search for a desired content.

Figure 16:
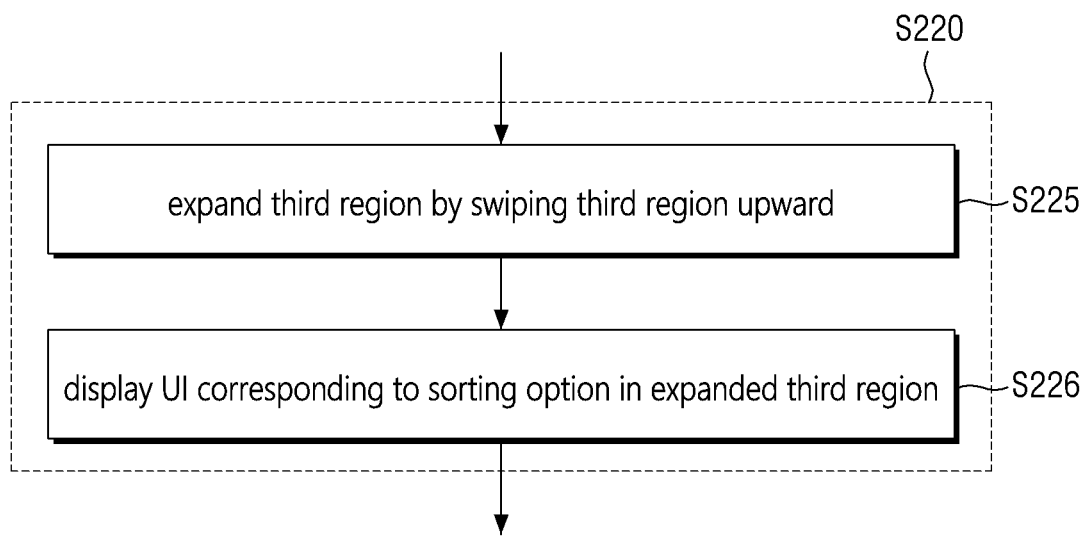
FIG. 16 is an exemplary diagram for describing some operations shown in FIG. 4.

FIG. 16 is an exemplary diagram for describing some operations shown in FIG. 4.

In step S225, the third region may be expanded and displayed by a user interaction of swiping upward on the third region of the screen of the user terminal. At this time, the third region may be a sorting option selection region 3*e* on the screen 300*b* of the user terminal of FIG. 3.

Also, in step S226, a UI corresponding to a sorting option may be displayed on the expanded third region. It will be described in detail with reference to FIG. 17.

Figure 17:
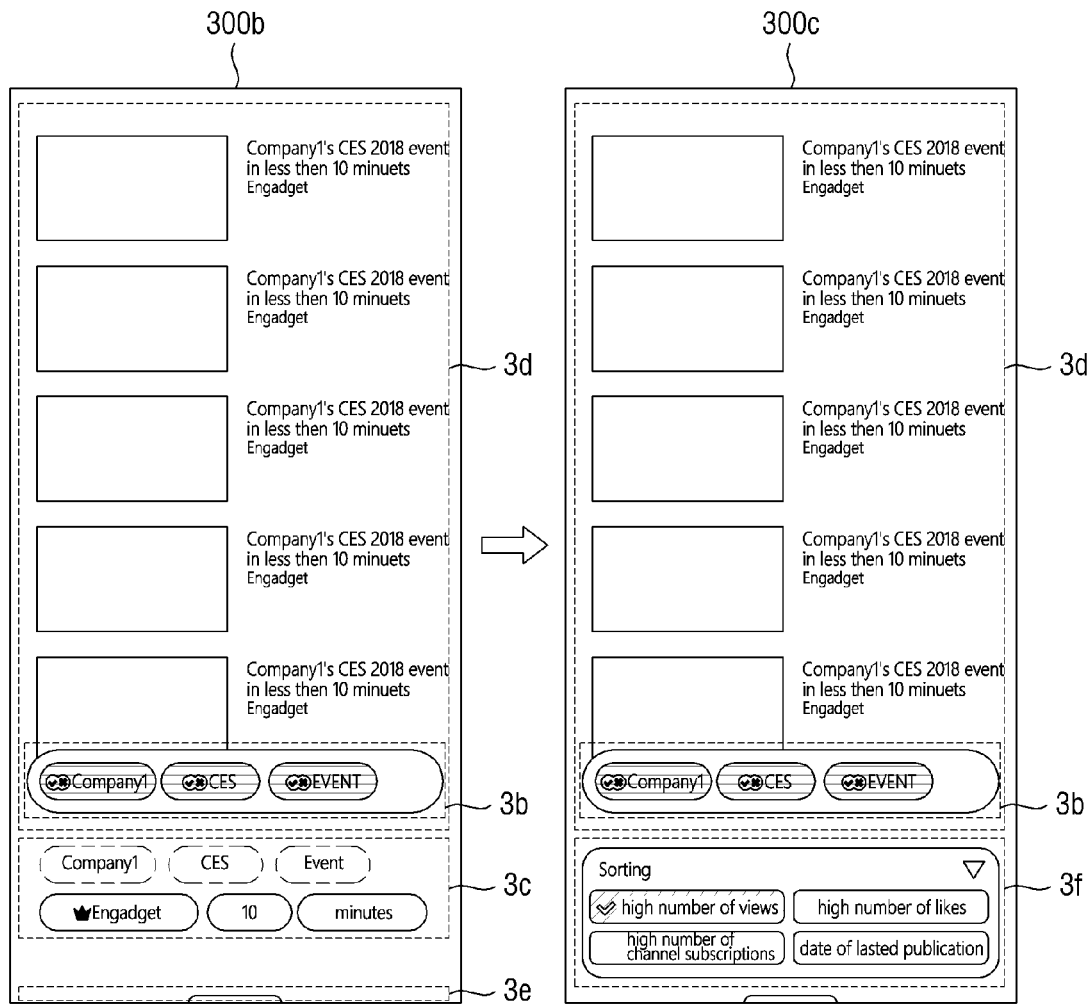
FIG. 17 is an exemplary view of a screen displayed for an additional option region capable of setting content sorting options according to an embodiment of the present disclosure.

FIG. 17 is an exemplary view of a screen displayed for an additional option region capable of setting content sorting options according to an embodiment of the present disclosure.

On the screen 300*b* of the user terminal shown on the left side of FIG. 17, the user may swipe the sorting option selection region 3*e* upward. Accordingly, an additional region 3*f* created by expanding the sorting option selection region 3*e* may be displayed on the screen 300*c* of the user terminal shown on the right side of FIG. 17.

At this time, the additional region 3*f* may include options such as "high number of views", "high number of likes", "high number of channel subscriptions", and "date of latest publication" as sorting options. The user may select any one or more of the options, and a search result reflecting the option selected by the user may be automatically displayed in the search result content list region 3*d* in the screen 300*c* of the user terminal.

Figure 18:
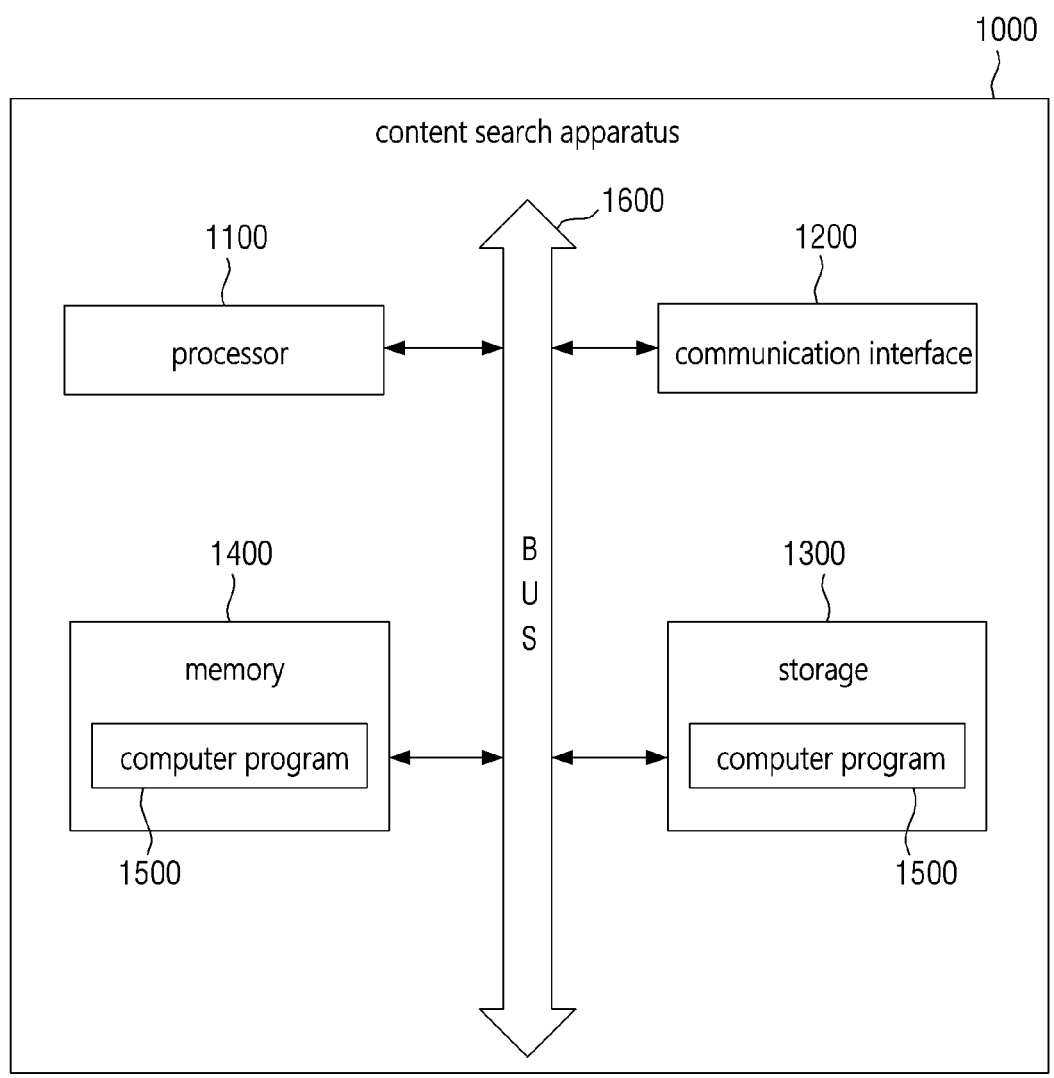
FIG. 18 is a hardware configuration diagram of a content search system according to some embodiments of the present disclosure.

FIG. 18 is a hardware configuration diagram of a content search system according to some embodiments of the present disclosure. The content search system 1000 shown in FIG. 18 may comprise one or more processors 1100, a system bus 1600, a communication interface 1200, a memory 1400 for loading a computer program 1500 executed by the processor 1100, and a storage 1300 for storing the computer program 1500.

The processor 1100 controls the overall operation of each component of the content search system 1000. The processor 1100 may perform an operation for at least one application or program for executing a method/operation according to various embodiments of the present disclosure. The memory 1400 stores various data, commands and/or information. The memory 1400 may load one or more computer programs 1500 from storage 1300 to execute methods/operations according to various embodiments of the present disclosure. The bus 1600 provides a communication function between components of the content search system 1000. The communication interface 1200 supports internet communication of the content search system 1000. The storage 1300 may non-temporarily store one or more computer programs 1500. The computer program 1500 may include one or more instructions, in which methods/operations according to various embodiments of the present disclosure are implemented. When the computer program 1500 is loaded into the memory 1400, the processor 1100 may perform methods/operations according to various embodiments of the present disclosure by executing the one or more instructions.

In some embodiments, the content search system 1000 described with reference to FIG. 18 may be configured using one or more physical servers included in a server farm based on a cloud technology such as a virtual machine. In this case, among the components shown in FIG. 18, at least some of the processor 1100, memory 1400, and storage 1300 may be virtual hardware, and the communication interface 1200 may also be configured as a virtualized networking component such as a virtual switch.

Embodiments of the present disclosure have been described above with reference to FIGS. 1 through 18, but it should be noted that the effects of the present disclosure are not limited to those described above, and other effects of the present disclosure should be apparent from the following description.

The technical features of the present disclosure described so far may be embodied as computer readable codes on a computer readable medium. The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

The protection scope of the present invention should be interpreted by the following claims, and all technical ideas within the equivalent range should be interpreted as being included in the scope of the technical ideas defined by the present disclosure.

What is claimed is:

1. A method performed by at least one processor for searching a content, the method comprising:
    receiving a predefined user input with respect to a text region;
    extracting, in response to the predefined user input, at least one word from the text region;
    creating a search condition based on the extracted at least one word; and
    displaying a list of contents searched based on the created search condition,
    wherein the extracted at least one word comprises a plurality of words, and
    wherein the creating the search condition comprises:
    displaying at least one word to be used in creating the search condition among the plurality of words in a first region different from the text region; and
    displaying at least one word not to be used in creating the search condition among the plurality of words in a second region different from the text region.

2. The method of claim 1, wherein the displaying the at least one word to be used in creating the search condition comprises:
    displaying at least one word whose number of searches is equal to or greater than a reference value in the first region.

3. The method of claim 1, wherein the displaying the at least one word not to be used in creating the search condition comprises:
    displaying, in response to a predefined user input with respect to a first word located in the second region, a plurality of button user interfaces (UIs) in a region adjacent to the first word, and
    wherein the creating the search condition comprises:
    creating the search condition in response to a user input with respect to at least one of the plurality of button UIs.

4. The method of claim 3, wherein the plurality of button UIs comprises a first button UI corresponding to an option for determining whether the first word is to be included in the search condition and a second button UI corresponding to an option for extracting a word related to the first word.

5. The method of claim 4, wherein the creating the search condition in response to the user input with respect to the at least one of the plurality of button UIs comprises:
    displaying a plurality of words related to the first word in the region adjacent to the first word in response to a user input to the second button UI; and
    displaying any one word selected from among the displayed plurality of words in the second region.

6. The method of claim 1, wherein the displaying the at least one word to be used in creating the search condition comprises:
    displaying an indicator indicating whether a first word is included in the search condition in a region adjacent to the first word.

7. The method of claim 1, wherein the displaying the at least one word to be used in creating the search condition comprises:
    based on a user input to move a first word located in the second region to the first region, displaying the first word in the first region.

8. The method of claim 1, wherein the displaying the at least one word not to be used in creating the search condition comprises:
    based on a user input to move a first word located in the first region to the second region, displaying the first word in the second region.

9. The method of claim 1, wherein the displaying the at least one word not to be used in creating the search condition comprises:
    displaying a first word corresponding to information on a content publisher together with an indicator indicating that the first word is information on the content publisher in a region adjacent to the first word in the second region.

10. The method of claim 1, wherein the displaying the at least one word not to be used in creating the search condition comprises:
    based on a user input to move a first word located in the second region to a region adjacent to a second word in the second region, displaying a third word, in which the first word and the second word are combined, in the second region.

11. The method of claim 10, wherein the displaying the third word in the second region comprises:
    displaying, in response to a predefined user input with respect to the third word, a plurality of button user interfaces (UIs) in a region adjacent to the third word, and wherein the creating the search condition comprises:
    creating the search condition in response to a user input with respect to the plurality of button UIs.

12. The method of claim 11, wherein the plurality of button UIs comprise a third button UI corresponding to an option for restoring the third word to the first word and the second word.

13. The method of claim 1, wherein a first word, included in the at least one word to be used in creating the search condition and displayed in the first region, is also displayed in the second region,
    the method further comprising:
    adjusting a weight based on a user input with respect to the first word located in the second region while in a long-pressed state; and automatically displaying a search result, to which the adjusted weight is reflected.

14. The method of claim 1, wherein the automatically providing the list of contents comprises:
    expanding a third region based on a user input to swipe the third region upward; and
    displaying a user interface (UI) corresponding to a sorting option in the expanded third region.

15. An apparatus for searching a content, the apparatus comprising:
    at least one processor; and
    at least one memory configured to store computer program executable by the at least one processor,
    wherein the computer program, when executed by the at least one processor, causes the at least one processor to perform:
    receiving a predefined user input with respect to a text region;
    extracting, in response to the predefined user input, at least one word from the text region;
    creating a search condition based on the extracted at least one word; and displaying a list of contents searched for based on the created search condition, wherein the extracted at least one word comprises a plurality of words, and wherein the creating the search condition comprises:

displaying at least one word to be used in creating the search condition among the plurality of words in a first region different from the text region; and displaying at least one word not to be used in creating the search condition among the plurality of words in a second region different from the text region.

16. The apparatus of claim 15, wherein the displaying the at least one word to be used in creating the search condition comprises:

based on a user input to move a first word located in the second region to move to the first region, displaying the first word in the first region.

17. The apparatus of claim 15, wherein the displaying the at least one word not to be used in creating the search condition comprises:

based on a user input to move a first word located in the first region to the second region, displaying the first word in the second region.

18. The apparatus of claim 15, wherein a first word, included in the at least one word to be used in creating the search condition and displayed in the first region, is also displayed in the second region, and wherein the computer program further causes the at least one processor to perform:

adjusting a weight based on a user input with respect to the first word located in the second region while in a long-pressed state; and automatically displaying a search result, to which the adjusted weight is reflected.

* * * * *